Patented Aug. 9, 1932

1,870,269

UNITED STATES PATENT OFFICE

DONALD K. TRESSLER, OF GLOUCESTER, MASSACHUSETTS, ASSIGNOR TO FROSTED FOODS COMPANY, INC., OF DOVER, DELAWARE, A CORPORATION OF DELAWARE

EGG PRODUCT AND METHOD OF PRODUCING THE SAME

No Drawing.   Application filed August 16, 1930.   Serial No. 475,858.

This invention relates to novel egg products having new and valuable characteristics and to a novel method of producing them.

My invention is more particularly concerned with the problems of preserving liquid egg products for storage, shipment and distribution wherein refrigeration is relied upon. Methods of preserving liquid eggs by freezing as heretofore known and practiced are open to the objection that freezing processes, whether slow or rapid, tend to coagulate the yolk substance. After the frozen yolks have been thawed they do not return to their previous liquid condition but exist as a jell containing more or less solid matter. The result is that the egg substance is rendered unfit for many uses; for example, it is not practical to make mayonnaise from an untreated egg product which has been frozen. Various methods are known by which this objectionable coagulation may be prevented or reduced, as by the addition of relatively large amounts of foreign substances, such as salt or other chemicals. Treatment of that kind renders the egg substance unfitted for many uses and the product so treated cannot be sold as a pure egg substance. Moreover, such treatment may objectionably alter the flavor of the egg yolk and may also lower its freezing point so that difficulties are introduced into the freezing operation.

I have discovered that these objections may be avoided and coagulation by freezing may be substantially prevented in egg substances by treating the latter before freezing with a suitable enzyme as, for example, by adding to it a small amount of a proteolytic enzyme. Egg substance including yolks which have been so treated may be frozen and upon being thawed will return to their original fluid condition without objectionable change in consistency or flavor as compared to the fresh egg substance.

A further application of the discovery upon which my invention is based is in treating egg yolks, or egg substance containing yolks, which have been coagulated by freezing and have been then thawed. By treating the coagulated yolk substance with a suitable enzyme it may be again rendered liquid and substantially homogeneous in texture. My invention, therefore, is useful in at least two distinct fields; first, in treating egg substances to prevent their coagulation when subjected to freezing, and, second, in treating egg substances which have already been coagulated by freezing for the purpose of again rendering them liquid.

My invention, therefore, in one aspect comprises an egg product which has been treated with an enzyme, and in another aspect it comprises a novel method of preventing or dissipating coagulation due to freezing by treating egg substances with an enzyme. It will be understood, of course, that egg substances contain naturally some enzymes, and that the treatment contemplated by my invention results in increasing such natural enzyme content.

The features and advantages of my invention will be best understood and appreciated from the following description of some specific examples thereof, selected for purposes of illustration.

In order to treat an egg substance containing yolks so as to prevent coagulation in freezing, I add to the fresh yolks a small amount of pepsin either as a solid or in the form of an aqueous solution. The egg yolks and enzyme solution are then thoroughly mixed together by stirring or other form of agitation and the substance is then frozen by any desired method. After thawing, when the product is substantially free from coagulation, it may be used for any desired purpose.

I have referred to pepsin because it is one of the most effective enzymes and only a small quantity thereof is required to produce the desired results. For example, .01% of pepsin U. S. P. is sufficient to cause the egg yolk to return to a fluid condition in about 2 hours after thawing. Pepsin in a quantity of .005% will also bring about the desired action but with this small amount the thawed egg yolk will require substantially more time before it again becomes fluid. Pepsin in a quantity of .05% is more active than when used in .01% and rapidly causes the frozen egg yolk when thawed to return to a fluid condition.

If the egg substance is allowed to stand for an appreciable interval after the enzyme has been added and before the freezing step takes place, the return of the egg substance to a fluid condition occurs more rapidly than if no such interval is allowed. Satisfactory results in this respect have been secured by permitting the enzyme-treated egg substance to stand twenty-four hours before freezing.

Many other enzymes in addition to pepsin are suitable for preventing coagulation of the egg substance; for example, pancreatin, trypsin, rennin, papain, steapsin, or animal diastase, and in referring specifically to these enzymes I do not mean to exclude any enzyme having the properties of hydrolytic enzymes which I have not specifically mentioned. In using pancreatin, trypsin, rennin, papain, steapsin, or animal diastase, I have found satisfactory results are secured by using the enzyme in the quantity of .05%. Any of these enzymes, if added prior to freezing, will bring about the desired return of the egg yolk to a fluid consistency on thawing but the exact time required has been found to be characteristic of the particular enzyme used.

It is in some cases desirable to homogenize the egg substance and where this is done the enzyme may be conveniently introduced at the same time, as in this way a thorough diffusion thereof is insured. The product thus secured is believed to be novel and possesses characteristics of smoothness and uniformity of composition which are useful in many applications.

As already stated, the enzymes referred to above may be employed to dissipate coagulation which has already occurred in untreated egg yolk. For example, when egg yolk substance has been frozen and then thawed and is completely coagulated, the application of pepsin or other hydrolytic enzyme to the coagulated egg yolk substance will change it to a fluid condition although not to the same complete degree that is presented when the egg yolk is treated prior to freezing.

As above indicated, but very small amounts of a suitable enzyme are required to produce the desired results and the addition of these minute amounts does not in any way change the flavor or odor of the yolk. The product may be used for practically all purposes for which fresh egg yolk is suited, such as the making of mayonnaise, cakes, egg nog, ice cream, etc. The treated thawed egg yolk can be mixed with water when it is desired to use it in solution. The quantity of enzyme added is so small that the treated egg yolks contain substantially the same amount of yolk per pound as is found in the fresh yolk substance.

Having thus described my invention, what I claim as new and desire to secure by Letters Patent is:

1. A liquid egg product having diffused therein the solution of an added hydrolytic enzyme.
2. A liquid egg product containing an added hydrolytic enzyme.
3. A liquid egg product containing an added proteolytic enzyme.
4. A liquid egg product containing an added lipolytic enzyme.
5. A liquid egg product containing an added amylolytic enzyme.
6. A liquid egg product containing between 0.10% and 0.005% pepsin U. S. P.
7. A liquid egg product containing between 0.10% and 0.005% pancreatin U. S. P.
8. A liquid egg product containing between 0.10% and 0.005% trypsin U. S. P.
9. A frozen egg product having frozen therein an added hydrolytic enzyme.
10. A frozen egg product containing yolks mixed with the solution of a hydrolytic enzyme and frozen therewith.
11. A thawed liquid egg product containing uncoagulated yolks treated with an added hydrolytic enzyme.
12. A liquid egg product comprising homogenized egg substance mixed with an added hydrolytic enzyme.
13. A method of preventing coagulation of the frozen yolk content of liquid eggs, which consists in treating the egg content with an added hydrolytic enzyme.
14. A method of preventing coagulation in frozen egg content which consists in homogenizing the egg products, and treating with an added hydrolytic enzyme prior to the freezing step.
15. A method of preventing coagulation in freezing liquid egg products, which consists in adding a hydrolytic enzyme to the egg content before freezing it.
16. A method of preserving liquid egg products, which consists in treating its egg content with an added hydrolytic enzyme and then freezing the treated mixture.
17. A method dissipating coagulation in thawed yolk-containing products, which consists in treating the yolk content with an additional hydrolytic enzyme.
18. A method of preventing coagulation in the thawed egg substance of liquid eggs, which consists in treating the yolk content with pepsin and allowing it to stand for an appreciable interval before freezing it.
19. A method of preventing coagulation in the thawed egg substance of liquid eggs, which consists in treating the yolk content with pancreatin before freezing it.

DONALD K. TRESSLER.